Figure 1:
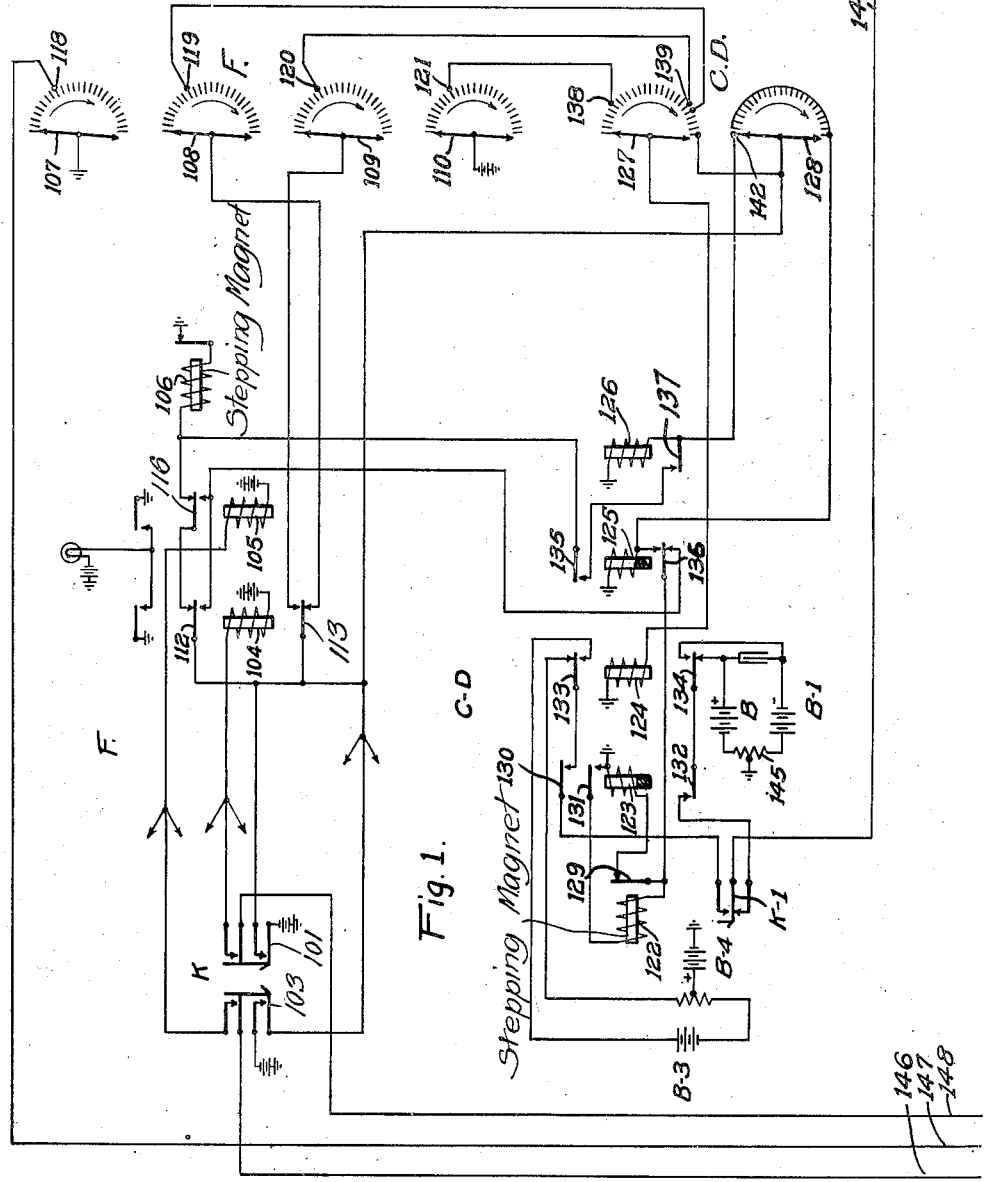

April 16, 1929.　　　J. L. McCOY　　　1,709,031
SUPERVISORY CONTROL SYSTEM
Filed May 22, 1924　　　5 Sheets-Sheet 5

WITNESSES:

INVENTOR
James L. McCoy.
BY
ATTORNEY

Patented Apr. 16, 1929.

1,709,031

UNITED STATES PATENT OFFICE.

JAMES L. McCOY, OF WILKINSBURG, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed May 22, 1924. Serial No. 715,056.

My invention relates, in general, to control systems, and more particularly to systems for remotely controlling and supervising, from a central point, electrical equipment.

One object of my invention is to provide simple and inexpensive equipment for controlling and supervising, from a dispatcher's office, the electrical equipment in a remote station.

Another object of my invention is to provide means for more positively operating the selecting equipment.

Another object of my invention is to provide means for recording, at the dispatcher's office, the impulse code that is sent by the selective apparatus in the substation.

A still further object of my invention is to provide means for making a record of the time at which such impulses are sent.

There are other objects of the invention which, together with the foregoing, will be described more fully hereinafter.

Referring now to the drawings, comprising Figures 1 to 6, inclusive, the selective apparatus is shown by means of conventional diagrams in Figs. 1 to 4, inclusive.

Figure 2:
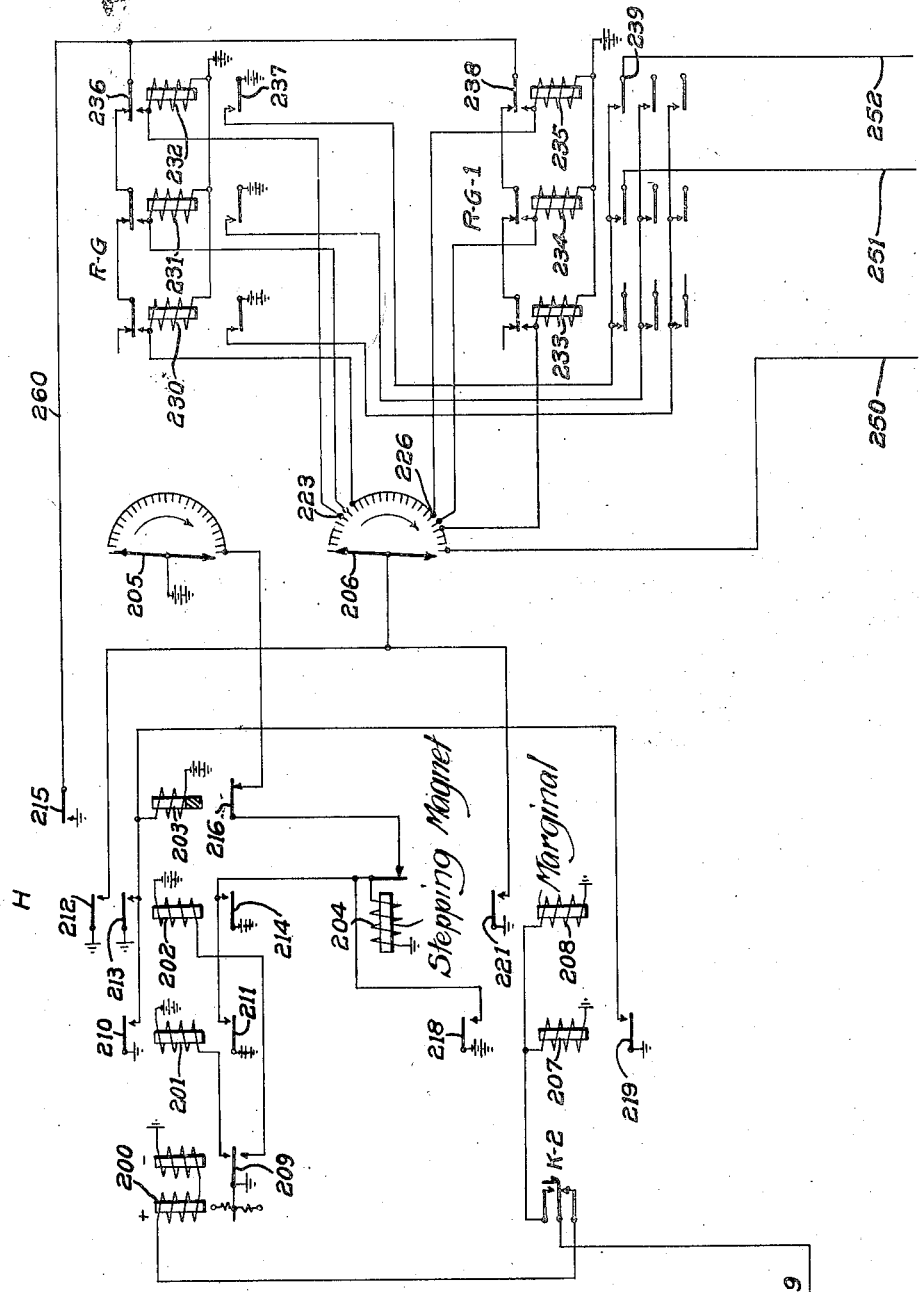
Figure 3:
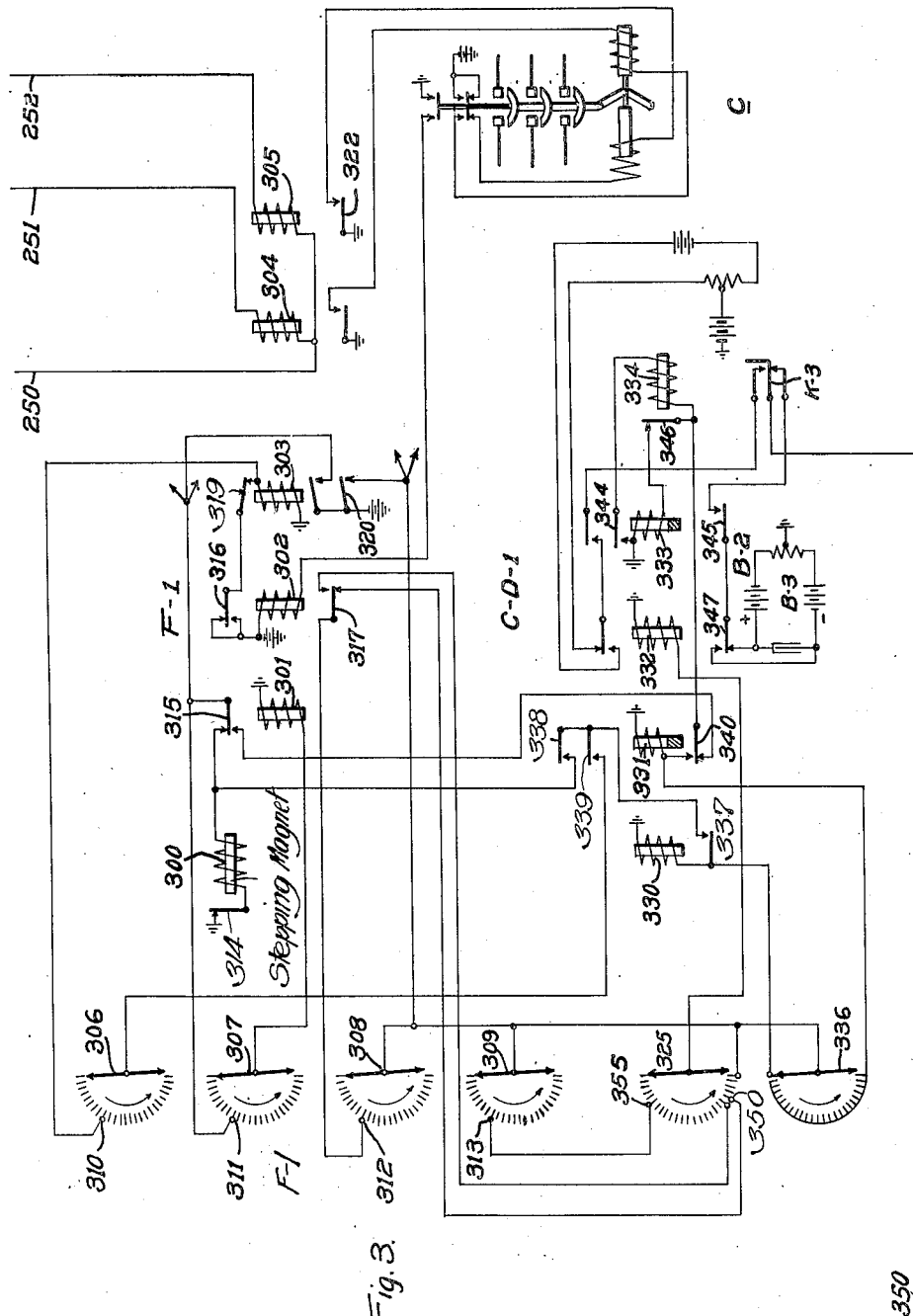
Figure 4:
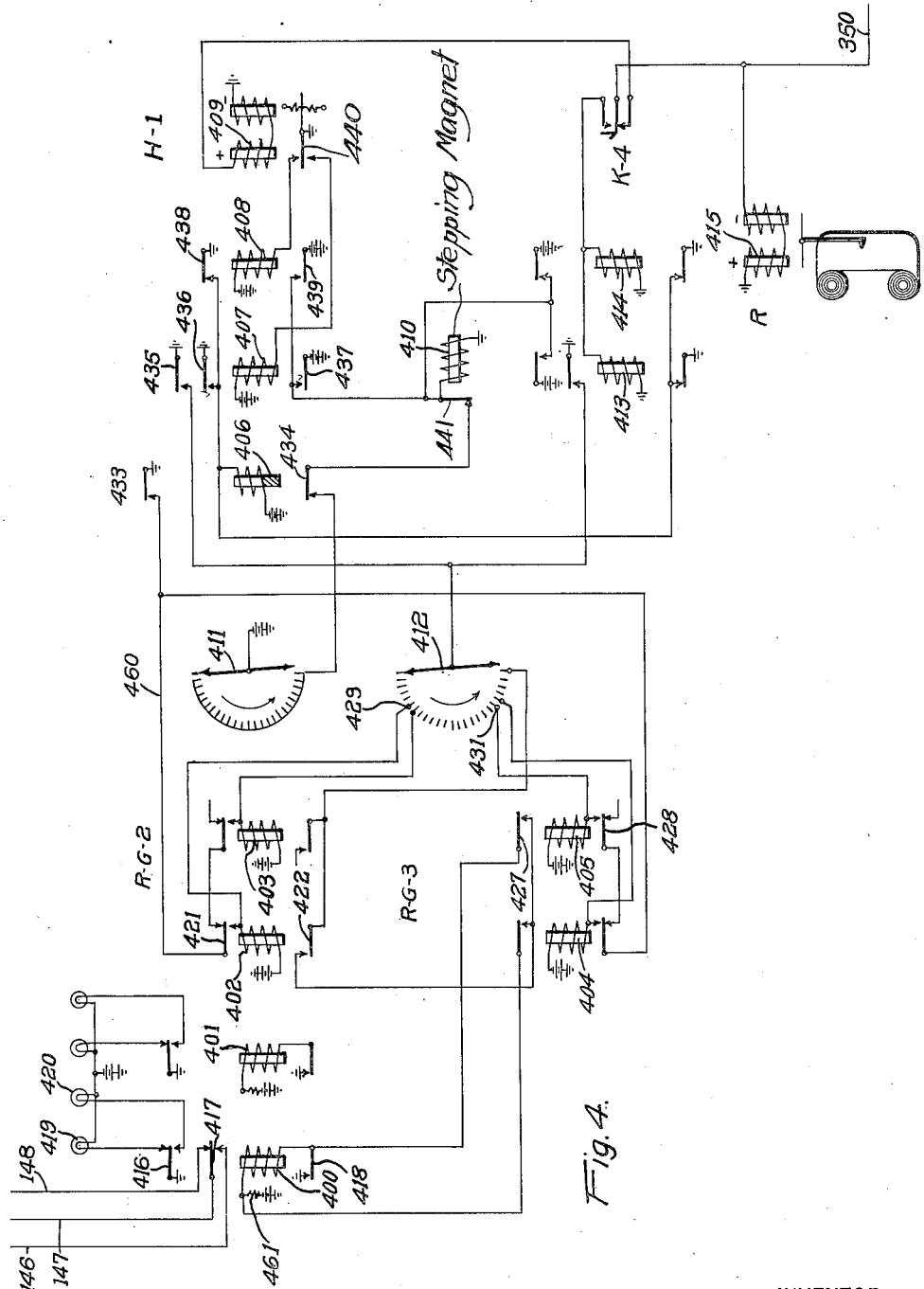

The apparatus and circuits located at the dispatcher's office are shown in Figs. 1 and 4, while the apparatus and circuits located at the substation are shown in Figs. 2 and 3.

In practicing my invention, I provide a plurality of keys at the dispatcher's office, one for each apparatus unit. A finder switch is provided for hunting any operated key. A code-sending switch is associated with said finder switches and operates to send a code of impulses to the substation, depending upon the position of the finder switch.

At the substation, a connector switch is provided for connecting with the selected apparatus unit, in accordance with the code transmitted by the code sender. A finder switch and code-sending switch are also provided at the substation which are operated responsive to the operation of a unit therein. A connector switch is provided at the dispatcher's office and controls the operation of supervisory signalling devices, there being two of the latter for each apparatus unit that it is desired to supervise.

Briefly, the operation of my invention proceeds as follows: When the dispatcher desires to operate an apparatus unit, he will operate the key corresponding to that unit, thereby causing the finder switch to select that key. As a result of the operation of the finder switch, the code-sending switch is operated to bring about the operation of the connector switch at the substation. By the operation of the connector switch, a predetermined apparatus unit is selected and operated. By the operation of said unit, the finder switch at the substation is operated to bring about the operation of the code-sending switch. The code-sending switch causes the operation of the connector switch at the dispatcher's office whereby the supervisory signalling devices are operated to indicate to the dispatcher that the desired unit has been operated.

Referring now more particularly to Fig. 1, the key K is one of a plurality of keys that is provided for controlling the operation of a predetermined apparatus unit. The key K is an ordinary double-throw key of the type that locks in operated position. A finder switch F is of the usual rotary type having four wipers 107 to 110, inclusive, each of which is adapted to engage a bank contact set having twenty-five bank contacts therein. A code-sending switch CD is provided with wipers 127 and 128, each of which is adapted to engage a bank contact set of twenty-five bank contacts. These switches are of the usual rotary type whose wipers move in a forward direction only. The wipers of the finder switch F have no normal position, while the wipers of the code-sending switch CD are restored to normal at the end of each operation. A key K—1 is an ordinary type of locking key and is provided for the purpose of changing the circuits of the code-sending switch CD in a manner which will be hereinafter described.

In Fig. 2, a connector switch H is of the usual type of rotary switch. However, its circuits have been so modified as to enable it to respond to directive control. Relays 230 to 235, inclusive, are provided for the purpose of selecting apparatus units, such as a circuit interrupter C. Relays 230 to 232, inclusive, comprise the relays of the primary selecting group RG, while relays 233 to 235, inclusive, comprise the relays of the secondary selecting group RG—1.

In Fig. 3, the circuit breaker C is of the usual type and may perform any desired function in the substation. The finder switch F—1 is similar to the finder switch F, previously described, while the code-sending switch CD—1 is similar to the code-sending switch CD, previously described.

In Fig. 4, the connector switch H—1 is similar to connector switch H, previously described. A time register R may be of any usual type arranged so as to make a record of the number of impulses and the time at which said impulses are recorded.

Relays 402 and 403 and 404 and 405 comprise a portion of the relays for selecting the lamp signalling relays 400 and 401. The relays 402 and 403 comprise a portion of the relays of the primary selecting group RG—2, while the relays 404 and 405 comprise a portion of the relays of the secondary selecting group RG—3. The relays 400 and 401 control the operation of supervisory signalling devices, such as 419 and 420.

Having briefly described the apparatus shown in the drawings, I will now explain its detailed operation. For this purpose, it will be assumed that the dispatcher desires to operate the circuit breaker C at the substation. In order to accomplish this result, the dispatcher will operate the key K in the proper direction, thereby forcing springs 101 and 103 into engagement with their working contacts. As a result of this operation, a circuit is completed which extends from battery by way of spring 103 and its working contact, armature 112 and its back contact, armature 116 and its back contact, stepping magnet 106 and armature 117 and its back contact to ground. Another circuit is completed in multiple with that traced above which extends from battery by way of spring 103 and its working contact, wiper 128, bank contact 142 and relay 126 to ground. The relay 126 is without particular function at this time.

The stepping magnet 106, as it interrupts its own circuit, operates as a buzzer to advance the switch wipers 107 to 110, inclusive, into engagement with the bank contact set comprising bank contacts 118 to 121, inclusive.

When the wipers are brought into this position, a circuit is completed extending from ground by way of wiper 107, bank contact 118, conductor 147, armature 417 and its back contact, conductor 148, spring 101 and its working contact and relay 104 to battery. The relay 104 is energized to open the circuit of the stepping magnet 106. The stepping magnet is thus deenergized and the movement of the wipers ceases.

Another result of the operation of the relay 104 is that a circuit is completed extending from battery by way of spring 103 and its working contact, armature 112 and its front contact, back contact and armature 136, armature 129 and its back contact and slow release relay 123 to ground. The relay 123 is energized to complete a circuit for the stepping magnet 122 from ground over the front contact and armature 131, winding of relay 122 and thence over the circuit traced above for relay 123, and to complete an impulsing circuit, at armature 132, which extends from the positive pole of battery B by way of back contact and armature 134, armature 132 and its front contact, resting contacts of key K—1, trunk conductor 149, resting contacts of key K—2 and polarized line relay 200 to battery.

The polarized line relay 200 is so constructed that, when its armature 209 is in its normal position, it is out of engagement with both its front and back contacts. The relay 200 is operated to bring the armature 209 into engagement with its front contact.

The stepping magnet 122 of the code-sending switch CD operates to open the circuit of the relay 123 at armature 129 and to position its pawl so as to advance the switch wipers 127 and 128 upon its deenergization. The relay 123 is deenergized to open the circuit of the magnet 122 which is also deenergized. The magnet 122 retracts its armature to advance the switch wipers 127 and 128 one step and to complete a circuit for the relay 123. The intermittent operation of the relay 123 and the stepping magnet 122 continues until the switch wipers 127 and 128 are brought into engagement with the bank contact set which includes the bank contact 138. A circuit is then completed extending from battery by way of wiper 110, bank contact 121, bank contact 138, wiper 127 and relay 134 to ground.

When the relay 201 is operated at the substation, a circuit is completed at armature 210 for the slow-releasing relay 203, while at armature 211 a circuit is completed for the stepping magnet 204. The stepping magnet 204 is energized to position its pawl. The slow-releasing relay 203 is energized to ground the conductor 260 at armature 215 and to open one circuit of the stepping magnet 204 at armature 216.

When the circuit of the polarized line relay 200 is opened by the deenergization of the relay 123 at the dispatcher's office, the relay 201 is deenergized and the circuit of the stepping magnet 204 is opened. The stepping magnet 204 is, consequently, deenergized to advance the switch wipers 205 and 206 into engagement with their second set of bank contacts. The operation of the switch wipers continues under the control of the relay 123 in an obvious manner.

When the relay 124 is energized at the dispatcher's office, a circuit is completed extending from the negative pole of the battery B—1 by way of front contact and armature 134, armature 132 and its front contact, normally closed springs of key K—1, trunk conductor 149, normally closed springs of key K—2, polarized line relay 200 to battery.

The relay 200 is now energized to bring its armature 209 into engagement with its back contact. As a result of this operation, a circuit is completed for the relay 202. The relay 202 is energized to complete a circuit for the slow-releasing relay 203 at armature 213, to complete a circuit for the stepping magnet 204 at armature 214 and to complete a circuit extending from ground by way of armature 212 and its front contact, wiper 206, bank contact 223 and relay 232 to battery. The relay 232 is energized to prepare certain selecting circuits at armature 237 and to establish a locking circuit for itself at armature 236. The stepping magnet 204 is energized to position its pawl.

The operation of the relay 124 does not interrupt the operation of the relay 123 and the stepping magnet 122. Consequently, the wipers 127 and 128 continue to be advanced in the manner described. The wipers 205 and 206 of the connector switch H at the substation are also advanced in the same manner.

When the switch wipers 127 and 128 are brought into engagement with the bank contact set which includes the bank contact 139, a circuit is completed extending from ground by way of spring 103 and its working contact, armature 113 and its front contact, wiper 109, bank contact 120, bank contact 139, wiper 127 and relay 124 to battery. The relay 124 is energized to complete a circuit extending from the negative pole of the battery B—1 to the line relay 200 of the connector H. The relay 200 is energized to bring about the operation of the relay 202. When the relay 202 is operated, the wipers 205 and 206 will be in engagement with the bank contact set which includes the bank contact 226.

As a result of the operation of the relay 202, a circuit is completed for the stepping magnet 204 at armature 214, for the relay 203 at armature 213, and another circuit is completed at armature 212 extending from ground by way of said armature and its front contact, wiper 206, bank contact 226 and relay 235 to battery. The relay 235 is energized to establish a locking circuit for itself at armature 238 and to place battery at 237 upon the conductor 252 at armature 239.

The intermittent operation of the relay 123 and the stepping magnet 122 continues in the manner described. The relay 124 is deenergized as soon as the wipers are rotated from the bank contact 139. The deenergization of the relay 124 brings about the operation of the polarized relay 200 in the opposite manner in engagement with its front contact and the relay 202 is deenergized to remove ground from the wiper 206.

The operation of the code-sending switch CD continues as before until the switch wipers 127 and 128 are brought into engagement with their twenty-fifth set of bank contacts. As a result of this operation, there is a circuit completed extending from battery by way of spring 103 and its working contact, bank contact 141, wiper 127 and relay 124 to ground.

A circuit is completed, when the wiper 128 engages its second set of bank contacts, for the slow-releasing relay 125 over a path extending from battery by way of spring 103 and its working contact, wiper 128, bank contact with which said wiper is in engagement and slow-releasing relay 125 to ground. This same circuit is completed on every bank contact except the first. The relay 125 is energized to open the circuit of the relay 123 at armature 136, to establish another circuit for said relay at the front contact of this armature and to prepare a circuit at armature 135 for the stepping magnet 106.

The energization of the relay 124 completes a circuit which extends from the negative pole of the battery B—1, front contact and armature 134, armature 132 and its front contact, normally closed springs of key K—1, trunk conductor 149, normally closed springs of key K—2 and polarized relay 200 to ground as previously traced. The relay 200 operates its armature 209 into engagement with its back contact, whereby the relay 202 is energized. The relay 202, upon being operated, completes a circuit for the stepping magnet 204 at armature 214, completes a circuit for the relay 203 at armature 213 and at armature 212 completes a circuit which extends from ground by way of said armature and its front contact, wiper 206, twenty-fifth bank contact, conductor 250, relay 305, conductor 252, armature 239 and its front contact, and front contact and armature 237 to battery. The relay 305 is energized to complete a circuit for the closing coil 325 of the circuit breaker C at armature 322.

As the relay 123 of the co-sending switch CD continues to operate as before, the wipers 127 and 128 are rotated into engagement with their first set of bank contacts. As a result of this operation, a circuit is completed for the relay 126. The relay 126, upon being operated, completes a circuit extending from battery by way of spring 103 and its working contact, wiper 128, armature 137 and its front contact, front contact and armature 135, stepping magnet 106 and armature 117 and its back contact to ground.

The stepping magnet 106 is operated a plurality of times to advance the wipers 107 to 110, inclusive, into engagement with another set of bank contacts. As soon as the wipers 127 and 128 are rotated into engagement with their first set of bank contacts, the circuit of the slow-releasing relay 125 is opened and this relay is deenergized, after a short interval of time, to open the circuit of the stepping magnet 106, which is also deenergized.

The energization of the relays 123 and 124 occurs, of course, when the switch wipers 127 and 128 are rotated from their twenty-fifth set of bank contacts. The latter operation causes the release of the line relay 200 of the connector H at the substation. The relay 202 is thus deenergized to open the circuit of the slow-releasing relay 203 and to open the circuit of the magnet 204. The magnet 204 is deenergized to advance the wipers into engagement with their first set of bank contacts.

Attention is drawn to the fact that the wipers 127 and 128 of the code-sending switch CD must rotate in synchronism with the wipers 205 and 206 of the connector switch H. Unless its synchronous operation takes place, a false selection will be secured at the substation. This false selection, however, will not cause any damage by reason of the fact that the wipers of the code-sending switch and connector switch must be in synchronism when they engage their twenty-fifth set of bank contacts. Unless they are in synchronism at this point, the relay 202 will not be energized when the wipers 205 and 206 are in engagement with their twenty-fifth set of bank contacts. When the code-sending operation is finished at the dispatcher's office, the connector switch is restored to normal over a path extending from battery by way of wiper 205, bank contact with which said wiper is in engagement, back contact and armature 216, back contact and armature 217, and stepping magnet 204 to ground.

The above code-sending operation will be repeated indefinitely until an answer-back signal is sent, indicating that the desired operation has been performed at the sub-station. The manner in which this answer-back signal is sent and the code-sending operation stopped will now be described.

When the circuit breaker C was operated, a circuit was completed extending from ground by way of pallet switch 323 and relay 302 to battery. The relay 302 is energized to interrupt the locking circuit of the relay 303, the relay 303 having been locked energized in a manner which will appear later.

As a result of the deenergization of the relay 303, a circuit is completed which extends from battery by way of armature 320 and its back contact, wiper 336, the first bank contact with which said wiper is in engagement and relay 330 to ground. The operation of the relay 330 is without particular function at the present time.

Another result of the operation of the relay 303 is that a circuit is completed extending from battery by way of armature 319 and its front contact, armature 315 and its back contact, magnet 300 and armature 314 and its back contact to ground. As the stepping magnet 300 interrupts its own circuit at armature 314, it operates as a buzzer to advance the wipers 306 to 309, inclusive, until they are brought into engagement with the bank contacts 310 to 313, inclusive.

When this occurs, a circuit is completed extending from battery by way of armature 319 and its back contact, bank contact 311, wiper 307 and relay 301 to ground. The relay 301 is energized to open the circuit of the magnet 300 at armature 315, whereby the rotation of the wipers 306 to 309, inclusive, ceases. Another result of the operation of the relay 301 is that a circuit is completed extending from battery by way of armature 319 and its back contact, armature 315 and its front contact, back contact and armature 340, armature 346 and its back contact and slow-release relay 333 to ground.

The relay 333 is energized to complete a circuit for the stepping magnet 334 at armature 344 and to complete an impulsing circuit at armature 345. The stepping magnet 334 is energized to position its pawl and to open the circuit of the relay 333. The relay 333 is deenergized to open the circuit of the stepping magnet 334 and to open the previously mentioned impulsing circuit. The stepping magnet 334 is deenergized to advance the switch wipers 335 and 336 one step and to again complete the circuit of the relay 333.

When the relay 333 is operated, the impulsing circuit extends from the positive pole of the battery B—2, back contact and armature 347, armature 345 and its front contact, normally closed springs of key K—3, trunk conductor 350, normally closed springs of key K—4, and polarized line relay 409 to ground.

The polarized line relay 409 is constructed in a manner similar to that of the line relay 200 of the connector H. The relay 409 operates the armature 440 into engagement with its front contact, whereby a circuit is completed for the relay 408. The relay 408 operates to complete a circuit for the relay 406 at armature 438 and to complete a circuit for the stepping magnet 410 at armature 439. The slow-releasing relay 406 is energized to place ground upon the conductor 460 at armature 433 and to open the releasing circuit at armature 434. The stepping magnet 410 is energized to position its pawl.

When the relay 333 is deenergized, the circuit of the polarized line relay 409 is opened. This relay is deenergized to open the circuit of the relay 408. The relay 408 is deenergized to open the circuit of the stepping magnet 410. The stepping magnet 410 retracts its armature to advance the switch wipers 411 and 412 one step.

At the substation, the relay 333 and the stepping magnet 334 continue to operate to advance the switch wipers 335 and 336. When the switch wipers are brought into engagement with the bank contact set which includes the bank contact 355, a circuit is completed extending from battery by way of armature 320 and its back contact, wiper 309, bank contact 313, bank contact 355, wiper 325, and relay 332 to ground.

The wipers 411 and 411 of the connector switch H—1 are advanced simultaneously with the wipers 335 and 336 of the code-sending switch CD—1 in an obvious manner.

The relay 332 is energized to complete a circuit which is effective upon the next operation of the relay 333, which extends from the negative pole of the battery B—3 by way of front contact and armature 347, armature 345 and its front contact, normally closed springs controlled by key K—3, trunk conductor 350, normally closed springs controlled by key K—4 and polarized line relay 409 to ground.

The relay 409 operates its armature 440 into engagement with its back contact, thereby completing a circuit for the relay 407. The relay 407 operates to complete a circuit for the stepping magnet 410 at armature 437, to complete a circuit for the slow-releasing relay 406 at armature 436, and to complete a circuit extending from ground by way of armature 435 and its front contact, wiper 412, bank contact 429, wipers 411 and 412 being now in engagement with the bank contact set which includes this bank contact, and relay 402 to battery. The relay 402 is energized to establish a locking circuit for itself at armature 421 and to prepare a selecting circuit at armature 422.

At the substation, the relay 333 and the stepping magnet 334 continue to operate to bring about the advancement of the wipers 335 and 336. The wipers 411 and 412 of the connector switch H—1 are advanced in synchronism with the wipers 325 and 336 of the code-sending switch CD—1.

When the wipers 335 and 336 are brought into engagement with the bank contact 350, a circuit is completed extending from battery by way of armature 320 and its back contact, wiper 308, bank contact 312, armature 317 and its front contact, bank contact 350, wiper 325 and relay 332 to ground. The relay 332 is energized to complete a circuit extending from the negative pole of the battery B—3, front contact and armature 347, armature 345 and its front contact, normally closed springs of key K—3, trunk conductor 350, normally closed springs of key K—4, and polarized line relay 409 to battery. The relay 409 operates its armature 440 into engagement with its back contact, thereby causing the energization of the relay 407. The relay 407 operates to complete the circuit of the stepping magnet 410 and to complete a circuit extending from ground by way of armature 435 and its front contact, wiper 412, bank contact 431 and relay 405 to battery. The relay 405 is energized to establish a locking circuit for itself at armature 428 and to prepare a circuit for the relay 400 at armature 427.

On the first movement of the switch wipers, the relay 331 is energized to open one point in the circuit of the relay 333 and to complete a new circuit for said relay at armature 340. The operation of the relay 333 and the magnet 334 of the code-sending switch CD—1, at the substation, continue in the same manner as before, the relay 332 being deenergized as soon as the switch wipers are rotated out of engagement with the bank contact 350. The relay 409 is thus operated to force its armature from engagement with its back contact, thereby effecting the deenergization of the relay 407. The relay 333 and the magnet 334 operate to advance the wipers 335 and 336 until said wipers are brought into engagement with their twenty-fifth set of bank contacts. As a result of this operation, a circuit is completed extending from battery by way of armature 320 and its back contact, twenty-fifth bank contact, wiper 335 and relay 332 to ground.

The energization of the relay 332 completes a circuit which extends from the negative pole of the battery B—3 through front contact and armature 347, armature 345, normally closed springs of key K—3, trunk conductor 350, normally closed springs of key K—4 and polarized relay 409 to ground. The relay 409 operates its armature 440 into engagement with its back contact, thus completing a circuit for the relay 407. The relay 407 operates to complete a circuit for the stepping magnet 410 at armature 437, and to complete a circuit extending from ground by way of armature 435 and its front contact, wiper 412, twenty-fifth bank contact, armature 422 and its front contact, front contact and armature 427, relay 400 and resistor 461 to battery.

The relay 400 is energized to complete a locking circuit for itself at armature 418. Another result of the operation of the relay 400 is that the circuit of the supervisory signalling lamp 419 is opened and the circuit of the signalling lamp 420 is closed. By the change in supervisory signals, the dispatcher is apprised that the circuit breaker C at the substation has operated.

Another result of the operation of the relay 400 is that the circuit of the relay 104 of the finder switch F is opened and this relay is deenergized to restore the circuit of the finder switch F to normal. The code-sending operation now ceases by the code-sending switch CD being restored to normal in substantially the same manner as before described. The restoration of the connector H at the substation has also been previously described.

By the operation of the relay 333 and the magnet 334 in the code-sending switch CD—1, the wipers 325 and 336 are brought into engagement with their first set of bank contacts. A circuit is now completed extending from battery by way of armature 320 and its back contact, wiper 336, first bank contact, armature 337 and its front contact, armature 339 and its front contact, wiper 306, bank contact 310 and relay 303 to battery. The relay 303 is energized to establish a locking circuit for itself at armature 318 and to open the circuit of the relays 330 and 301 at armatures 319 and 320.

Another circuit in multiple with that traced above is completed for the stepping magnet 300 extending from battery by way of armature 320 and its back contact, wiper 336, first bank contact, armature 337 and its front contact, armature 338 and its front contact, stepping magnet 300 and armature 314 and its back contact to ground. The stepping magnet 300 is operated until the relay 303 is energized in a manner previously described.

In a similar manner, each of the other individual keys K is connected to a different contact on the finder switch of wiper 107 so that, upon operation of such a key, the finder switches will be stepped around to a different position before being brought to a stop. Since, as is evident from the above description, the code transmitted to the substation is determined by the contact upon which the finder switch has been brought to a stop, a different code will be transmitted for each key operated.

Attention is drawn to the fact that, in order to secure proper selective operation of the connector switch H—1, it is necessary for the wipers 335 and 336 of the code-sending switch CD—1 to be rotated in synchronism with the wipers 411 and 412 of the connector H—1. Unless such synchronism is maintained, the relay 407 is not energized when the wipers 411 and 412 are in their twenty-fifth position. Consequently, no operation is effected. The connector switch H—1 is then restored to normal over a circuit which extends from battery by way of wiper 411, bank contact with which said wiper is in engagement, back contact and armature 434, back contact and armature 441 and stepping magnet 410 to ground.

It will be seen that, each time the circuit of the line relay 409 is closed, a circuit is also completed for the relay 415 of the register R. The relay 415 operates the register, whereby the impulses sent over the line are recorded upon the tape 448. As the register relay 415 is polarized, the pen is operated in a certain manner.

When the current flow over the conductor 350 is such as to operate the armature 447 in one direction, the impulses are recorded upon a certain portion of the tape 448, while, when the armature 447 is operated in the opposite manner by current flow in the opposite direction over the conductor 350, impulses are recorded upon another portion of the tape. These current conditions occur when the impulses are transmitted over the line for operating the connector switch H—1, the current flowing in one direction to operate the connector H and the current flowing in the other direction to operate the connector and to select the relays in the primary and secondary selecting groups.

Figures 5, 6:
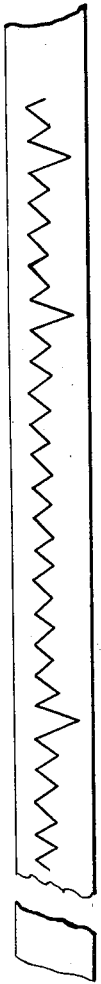

A specimen of the tape is shown in Fig. 6, the impulses 1 to 25 being the record that is made of the impulses which operate the connector switch H—1. The record of the impulses shown at 6 gives the operating and selecting impulses. In the same manner, the ordinary operating impulses are recorded at 7 to 19, inclusive, 20 being a selecting impulse, 21 to 24, inclusive, being operating impulses and 25 being a totalizing impulse. On the upper portion of the tape is recorded the time at which the impulses are sent. The armature of relay 415 is normally maintained in a neutral biased position mid-way between its two operated positions responsive to reversals of polarity of the impulses flowing through the polar magnet 415. On receipt of an impulse of a predetermined polarity for selecting operation, the armature is moved in one direction and when the polarity is reversed, it is moved in the opposite direction. A recording pointer is carried on the end of the armature as clearly shown in Figure 4 and makes a record on the chart as shown in Figure 6.

The dispatcher is able to ascertain the particular lamp that should be operated by this code of impulses by reference to the device shown in Fig. 5. In this manner the dispatcher is provided with a check upon the accuracy of the signalling lamps indicators. The device shown in Fig. 5 is arranged with a chart 501. On the left of the chart are plotted the figures that may be used as first selecting points. Thus, if the relay 407 of the connector switch H—1 is operated, when the switch wipers 411 and 412 of the connector switch H—1 are in engagement with the sixth set of bank contacts, this will be the first code point, as indicated by the tape.

The squares containing numbers at the upper portion of the chart show the various contacts that may be used for the second code point. The remaining portion of the chart shows the various combinations in such manner, that, if the first code point is referred to, then that column to the right of it noted and then the second code noted together with the column of figures below it, the intersection of the two will give the particular signalling device that should be operated by this code. Thus, in the present case, 6 and 20 are the code points and the signalling device associated with the apparatus unit #28 should be operated to indicate its trip position, the letter T designating "trip" and the letter C designating "closed".

In order to facilitate comparison between the two columns of figures, a slide rule may slide along opposite the various code points that are first selected in order that the proper column of figures may be more readily plotted.

In the foregoing description of the operation of the system, the current flow from the trunk conductors between the dispatcher's office and station are reversed in order to bring about a selecting operation. I will now describe how the result may be accomplished by the use of a booster battery that operates a marginal relay for accomplishing the selection.

In Figs. 1 and 2, in order to arrange the circuits of the apparatus to operate by booster battery, instead of reverse battery, the key K—1 at the dispatcher's office will be operated into the position opposite from that shown and the key K—2 at the substation will be operated into the position opposite from that shown. The operation, when the dispatcher desires to operate the circuit breaker C with the circuits arranged in this fashion, will now be briefly set forth.

When the key K—1 is operated, a circuit is completed for the motor magnet 106 of the finder switch F and the hunting operation of this finder switch occurs in the same manner as before until the wipers 107 to 110, inclusive, are brought into engagement with the bank contacts 118 to 121, inclusive. The relay 123 in the code-sending switch CD is then operated to bring about the energization of the magnet 122. The magnet 122 operates to open the circuit of the relay 123 at armature 129. The relay 123 is deenergized to open the circuit of the magnet 122. The magnet 122 is deenergized to advance the switch wipers one step.

By the advancement of the switch wipers, a circuit is completed for the slow-releasing relay 125 and this relay is energized to complete a new circuit for the relay 123. When the relay 123 is operated, there is a circuit completed extending from the positive pole of the battery B—4, back contact and armature 133, front contact and armature 130, operated springs of key K—1, trunk conductor 149, operated springs of key K—2, and relays 207 and 208 in multiple to ground. The relay 207 is the only one that responds to current from the battery B—4 alone.

Upon operating, the relay 207 completes a circuit for the magnet 204 at armature 218 and completes a circuit for the slow-releasing relay 203 at armature 219. The magnet 204 is energized to so position its pawl as to advance the switch wipers upon its deenergization.

The operation of the code-sending switch CD now proceeds in substantially the same manner as before described until the bank contact set, including the bank contact 138, is engaged by the wipers 127 and 128. As a result of this operation, the relay 124 is energized.

Now, when the relay 123 operates, a circuit is completed extending from the positive pole of the battery B—4, negative pole of the battery B—3, positive pole of the battery B—3, front contact and armature 133, front contact and armature 130, operated springs of key K, trunk conductor 149, operated springs of key K—2, and relays 207 and 208 in multiple to ground.

As the voltage applied to the trunk conductor 149 is increased by the voltage of the battery B—5, the current flow over the trunk circuit is increased and both the relays 207 and 208 are operated. The operation of the relay 207 brings about the same results as before. The operation of the relay 208 places ground upon the wiper 206, whereby the relay 232 is energized.

The selecting operations occur substantially in the same manner as before described when the batteries B and B—1 at the dispatcher's office are used for controlling the operation of the connector switch H, and the circuit breaker C will be operated when the wipers of the code-sending switch CD and the wipers of the connector switch H are brought into their twenty-fifth positions simultaneously.

The circuits of the code-sending switch CD—1 and the connector H—1 may be changed to respond to booster battery impulses for selection by operating the keys K—3 and K—4 at the substation and dispatcher's office, respectively. The operation of the code-sending switch CD—1 and the connector switch H—1, with these keys operated, is substantially the same as the operation of the code-sending switch CD and the connector H in so far as the selective operations are concerned. Of course, when the circuit breaker C is operated by the operation of the connector switch H, the finder switch F—1, the code-sending switch CD—1 and the connector switch H—1 are operated to bring about the operation of the signalling device 420 at the dispatcher's office to indicate its operation.

My invention is not limited to the particular arrangement of the apparatus illustrated, but may be variously modified without departing from the spirit and scope thereof, as set forth in the appended claims.

I claim as my invention:

1. In an electrical control system, the combination with a dispatcher's office, a station, apparatus units in said station, a selecting device at said office and a selecting device at said station, of a circuit connecting said office and station, means for operating said first selecting device to send a predetermined number of impulses over said circuit, means responsive to said impulses for operating the selecting device at said station, means for changing the polarity of predetermined ones of said impulses, to cause the selecting device at said station to operate a predetermined one of said units, and means for preventing the operation of said unit unless said selecting devices have maintained proper relative positions during the transmission of said impulses.

2. In an electrical control system, the combination with a dispatcher's office, a station, devices at said office, a selecting device at said office, of a circuit connecting said office and station, means at said station for sending a predetermined number of impulses over said circuit, means at said office responsive to said impulses for operating the selecting device thereat, means for changing the character of predetermined ones of said impulses to cause the selecting device to operate a predetermined one of said devices, means for preventing the operation of said device unless said selecting device has operated correctly in accordance with said received impulses and means for making a record of each of said received impulses irrespective of whether said device is operated or not.

In testimony whereof, I have hereunto subscribed my name this 2nd day of May, 1924.

JAMES L. McCOY.